No. 793,869. Patented July 4, 1905.

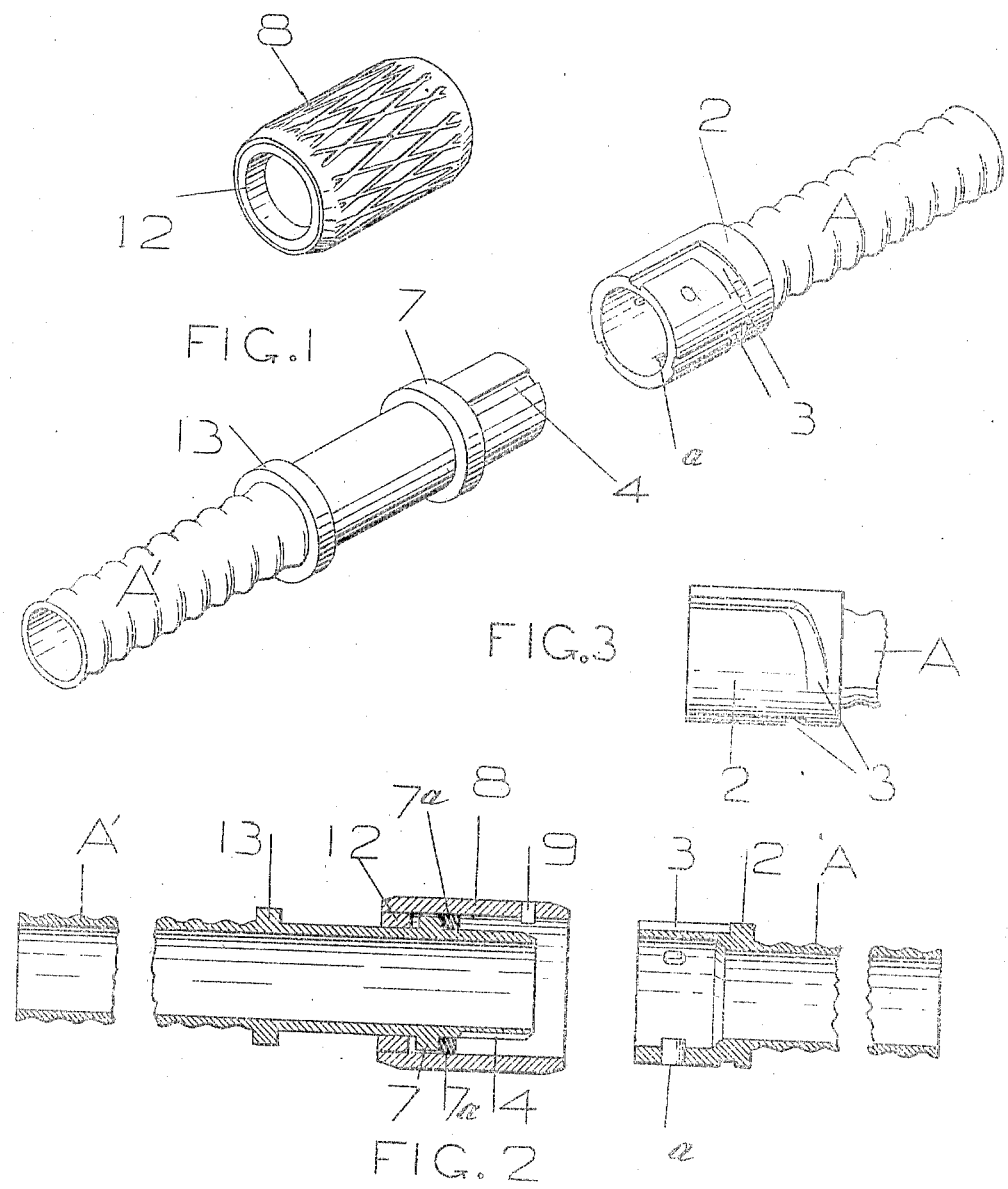

UNITED STATES PATENT OFFICE.

ANDREW H. ANDERSON, OF KELLOGG, IDAHO, ASSIGNOR OF ONE-THIRD TO EDWARD FRANKLIN, ONE-THIRD TO CHARLES POWELL, AND ONE-SIXTH TO JOHN E. LANE, OF KELLOGG, IDAHO.

HOSE-COUPLING.

SPECIFICATION forming part of Letters Patent No. 793,869, dated July 4, 1905.

Application filed March 15, 1905. Serial No. 250,172.

*To all whom it may concern:*

Be it known that I, ANDREW H. ANDERSON, a citizen of the United States, residing at Kellogg, in the county of Shoshone and State of Idaho, have invented new and useful Improvements in Hose-Couplings, of which the following is a specification.

My invention relates to a device which is designed for the detachable coupling of hose or like conductors.

It consists in the combination and arrangement of parts and in details of construction, which will be more fully explained by reference to the accompanying drawings, in which—

Figure 1 is a perspective view showing the parts of the coupling disengaged. Fig. 2 is a longitudinal section of the coupling. Fig. 3 is a side view of head showing inclined slot.

A A' represent those portions of the coupling to which the hose or other conductor is to be attached. These parts may be made in any suitable or well-known manner, as by corrugating, so that the conducting-pipe may be securely fixed to these portions of the coupling. The part A has an enlarged head 2, with channels 3 made in it. These channels extend parallel with the axis of the pipe for a certain distance, then are turned at right angles and extend circumferentially around the pipe, becoming gradually shallower, each terminating before reaching the straight portion of the following channel. The end of the other portion A' has straight slots or channels 4 made in it, and this end is adapted to telescope inside the head 2 until it abuts against the end of the pipe A. These ends may preferably be beveled so as to fit snugly together, as plainly shown in Fig. 2. The head 2 has pins $a$ projecting inwardly, and these pins are so located that the slots 4 of the part A' will slide over the pins, and the two parts are thus prevented from turning with relation to each other.

A short distance behind the ends of the slots 4 of the part A' is fixed a collar 7, and in front of the collar may be a washer $7^a$ to insure a tight joint between this collar and the end of the head $A^2$, which abuts against the washer when the two parts have been slipped together. A sleeve 8 is made of sufficient diameter to slide loosely over the collar 7 and also over the head 2. The rear end of the collar 8 has a ring or collar 12 fixed in it, which when the collar is drawn forward will abut against the rear side of the fixed collar 7. The interior of the sleeve is fitted with pins 9, which project inwardly and are so located that when the ends of the pipes have been brought together, as previously described, the collar may be slipped forward, and the pins 9 will enter the slots 3 of the head 2 until they reach the circumferential portion of the slots, when the sleeve may be turned so that the pins will pass into these slots and will lock the two parts together and insure a tight joint. The rear collar or ring 12 of the sleeve abuts against the collar 7, and the beveled end of the pipe A' fits the corresponding bevel within the sleeve, so that when the parts are thus interlocked a solid and perfectly fluid-tight joint is produced. The gradually-diminishing depth of the circumferential portions of the slots 3 causes the pins 9 to bind in these slots, and thus prevent the sleeve 8 from being accidentally disengaged. 13 is another collar fixed upon the portion A' and behind the collar 7. This collar 13 forms a stop to limit the rearward movement of the sleeve. The outer surface of the sleeve may be serrated, corrugated, or otherwise roughened to provide a grip, so that it can be easily turned by hand. To disengage the parts, it is only necessary to turn the collar backwardly or reverse from the locking movement until the pins 9 coincide with the straight portions of the slots 3, when the collar may be pushed back until it contacts with the stop-collar 13 on the part A, and this releases the part A, so that it can be easily disengaged, or the two parts A A' may be pulled apart whenever the pins 9 in the sleeve coincide with the straight portions of the slots 3.

Having thus described my invention, what

I claim, and desire to secure by Letters Patent, is—

1. A hose-coupling consisting of two abutting sections, one of said sections having a head of sufficient interior diameter to receive the end of the other section, inwardly-projecting guide-pins within the head, coincident longitudinal slots on the exterior of the other section, slots upon the exterior of the head forming a bayonet-joint, a sleeve slidable over said head having pins engaging with the exterior slots and a fixed collar upon the entering section with which the rear end of the collar engages.

2. In a hose-coupling, two coupling-sections, one having a fixed head with an interior diameter adapted to receive the end of the other section, pins projecting inwardly in the head and slots in the entering section with which said pins engage, a collar fixed upon the second section having a washer in front adapted to contact and make a joint with the end of the head on the first section, a sleeve having an interior diameter fitting loosely over said collar, and over the head of the opposing section and a ring at the rear end forming a stop against the rear of the collar, pins projecting from the interior of the sleeve, slots formed in the exterior of the opposing head in lines coincident with the pins of the sleeve, said slots connecting at their inner ends with circumferential continuations into which the pins and the sleeve are turnable and by which the parts are locked together.

3. A hose-coupling consisting of two abutting sections of substantially equal diameter, a head upon one section chambered to receive the opposing end and having inwardly-projecting pins, slots in the other sections into which the pins are slidable, collars fixed upon said slotted sections, a sleeve slidable between the collars and having inwardly-projecting pins, slots upon the head of the other section into which said pins are slidable, said slots having circumferential extensions into which the pins of the sleeve are turnable to lock the coupling.

4. A hose-coupling having abutting ends, an inclosing head upon one end, with means to prevent relative turning of the two, and a sleeve turnable upon the male section, said sleeve having inwardly-projecting pins, slots on the exterior of the head into which the pins of the sleeve are slidable, said slots having circumferential continuations of gradually-decreasing diameter within which the sleeve-pins are turnably locked.

In testimony whereof I have hereunto set my hand in presence of two subscribing witnesses.

ANDREW H. ANDERSON.

Witnesses:
J. BRUDER,
H. VON BERG.